United States Patent
Osborn et al.

(10) Patent No.: US 9,962,913 B2
(45) Date of Patent: May 8, 2018

(54) MULTILAYER FILM

(71) Applicant: BEMIS COMPANY, INC., Neenah, WI (US)

(72) Inventors: Christopher L. Osborn, Germantown, WI (US); Brenna I. Brosch, Oshkosh, WI (US); Edward L. Haedt, Oshkosh, WI (US)

(73) Assignee: Bemis Company, Inc., Neenah, WI (US)

(*) Notice: Subject to any disclaimer, the term of this patent is extended or adjusted under 35 U.S.C. 154(b) by 0 days. days.

(21) Appl. No.: 14/646,778

(22) PCT Filed: Dec. 7, 2012

(86) PCT No.: PCT/US2012/068382
§ 371 (c)(1),
(2) Date: May 22, 2015

(87) PCT Pub. No.: WO2014/088585
PCT Pub. Date: Jun. 12, 2014

(65) Prior Publication Data
US 2015/0298439 A1 Oct. 22, 2015

(51) Int. Cl.
*A61J 1/03* (2006.01)
*B32B 27/32* (2006.01)
(Continued)

(52) U.S. Cl.
CPC ............. *B32B 27/32* (2013.01); *A61J 1/035* (2013.01); *B32B 7/12* (2013.01); *B32B 27/08* (2013.01);
(Continued)

(58) Field of Classification Search
CPC ......... B32B 27/32; B32B 27/36; B32B 27/08; B32B 27/18; B32B 7/12;
(Continued)

(56) References Cited

U.S. PATENT DOCUMENTS 3,635,376 A 1/1972 Hellstrom
3,809,221 A 5/1974 Compere
(Continued)

FOREIGN PATENT DOCUMENTS

EP 0481471 A1 * 4/1992
EP 1283224 A1 2/2003
(Continued)

OTHER PUBLICATIONS

Drug Information Online, retrieved Apr. 8, 2013 at http://www.drugs.com/pro/nicotine-patch.html.
(Continued)

*Primary Examiner* — Joanna Pleszczynska
(74) *Attorney, Agent, or Firm* — Lynn M. Nett (57) ABSTRACT

The present application describes a multilayer film having low water vapor permeability. The multilayer film of the present application is readily thermoformed and is, therefore, suitable for blister packaging sheets as well as for food packaging, medical barriers and device packaging, and other general purposes where low water vapor permeability is desired.

26 Claims, 3 Drawing Sheets

(51) Int. Cl.
    *B32B 7/12*            (2006.01)
    *B32B 27/08*         (2006.01)
    *B32B 27/36*         (2006.01)
    *B32B 27/18*         (2006.01)

(52) U.S. Cl.
    CPC ........... *B32B 27/18* (2013.01); *B32B 27/327* (2013.01); *B32B 27/36* (2013.01); *B32B 2250/05* (2013.01); *B32B 2307/714* (2013.01); *B32B 2307/7246* (2013.01); *B32B 2439/80* (2013.01)

(58) Field of Classification Search
    CPC .... B32B 2307/7246; B32B 2439/7246; B32B 2250/05; B32B 2307/714; B32B 2439/80; B65D 75/36; A61J 1/035; Y10T 428/24
    USPC .............. 428/172, 178, 483, 500, 515, 220; 206/531
    See application file for complete search history.

(56) References Cited

U.S. PATENT DOCUMENTS

| | | | |
|---|---|---|---|
| 3,912,081 A | 10/1975 | Haines et al. | |
| 3,912,082 A | 10/1975 | Gemer et al. | |
| 4,211,326 A | 7/1980 | Hein et al. | |
| 4,294,361 A | 10/1981 | Margulies et al. | |
| 4,884,693 A | 12/1989 | Brutsch | |
| 5,203,470 A * | 4/1993 | Brown | B65D 77/065 |
| | | | 222/105 |
| 5,218,049 A | 6/1993 | Yamamoto et al. | |
| 5,469,968 A | 11/1995 | Matthews et al. | |
| 5,532,030 A | 7/1996 | Hirose et al. | |
| 5,712,031 A | 1/1998 | Kelch et al. | |
| 5,758,774 A | 6/1998 | Leblong | |
| 5,783,273 A | 7/1998 | Yamamoto et al. | |
| 5,862,915 A | 1/1999 | Plezia et al. | |
| 5,876,814 A | 3/1999 | Oda et al. | |
| 5,894,930 A | 4/1999 | Faughey et al. | |
| 5,897,941 A | 4/1999 | Shah | |
| 6,006,913 A | 12/1999 | Ludemann et al. | |
| 6,041,929 A | 3/2000 | Brunner et al. | |
| 6,383,592 B1 | 5/2002 | Lowry et al. | |
| 6,546,281 B1 | 4/2003 | Zhang et al. | |
| 6,632,910 B2 | 10/2003 | Takagi et al. | |
| 6,682,797 B1 | 1/2004 | Otoi et al. | |
| 6,705,467 B1 | 3/2004 | Kancsar et al. | |
| 6,746,743 B2 | 6/2004 | Knoerzer et al. | |
| 6,969,740 B2 | 11/2005 | Klosiewicz | |
| 7,063,211 B2 | 6/2006 | Williams-Hartman | |
| 7,129,296 B2 | 10/2006 | Van Dun et al. | |
| 7,189,300 B2 | 3/2007 | Knoerzer et al. | |
| 7,243,798 B2 | 7/2007 | Buss | |
| 7,288,316 B2 | 10/2007 | Jester | |
| 7,365,130 B2 | 4/2008 | Rivett et al. | |
| 7,383,671 B2 | 6/2008 | Conti | |
| 7,416,768 B2 | 8/2008 | Knoerzer et al. | |
| 7,497,623 B2 | 3/2009 | Thomas et al. | |
| 7,608,317 B2 | 10/2009 | Keckeisen et al. | |
| 7,686,513 B2 | 3/2010 | Knoerzer et al. | |
| 7,829,633 B2 | 11/2010 | Heukelbach et al. | |
| 7,854,225 B2 | 12/2010 | Pasbrig et al. | |
| 7,919,171 B2 | 4/2011 | Young | |
| 7,919,174 B2 | 4/2011 | Young | |
| 8,003,179 B2 | 8/2011 | Merical et al. | |
| 8,056,716 B2 | 11/2011 | Fonteyne et al. | |
| 8,092,877 B2 | 1/2012 | Jester et al. | |
| 8,206,796 B2 | 6/2012 | Opusko et al. | |
| 8,377,529 B2 | 2/2013 | Bekele | |
| 8,574,694 B2 | 11/2013 | Neill et al. | |
| 8,863,967 B2 | 10/2014 | Suzuki et al. | |
| 2002/0012781 A1 | 1/2002 | Beer et al. | |
| 2002/0061982 A1 | 5/2002 | Donald et al. | |
| 2003/0236352 A1* | 12/2003 | Winowiecki | B82Y 30/00 |
| | | | 525/191 |
| 2005/0186373 A1 | 8/2005 | Rhee et al. | |
| 2005/0260366 A1 | 11/2005 | Magnussun | |
| 2006/0027480 A1 | 2/2006 | Buss | |
| 2006/0046006 A1 | 3/2006 | Bastion et al. | |
| 2006/0062946 A1 | 3/2006 | Beer et al. | |
| 2006/0198973 A1 | 9/2006 | Jester | |
| 2006/0249422 A1 | 11/2006 | Bates, Jr. | |
| 2006/0283758 A1 | 12/2006 | Pasbrig | |
| 2007/0054142 A1 | 3/2007 | Lee et al. | |
| 2007/0202337 A1 | 8/2007 | Lischefski et al. | |
| 2007/0212539 A1 | 9/2007 | Yamada et al. | |
| 2007/0221534 A1 | 9/2007 | Intini | |
| 2007/0224379 A1 | 9/2007 | Stevenson | |
| 2007/0259142 A1 | 11/2007 | Lischefski et al. | |
| 2007/0278114 A1 | 12/2007 | Kane et al. | |
| 2008/0067099 A1* | 3/2008 | Young | A61J 1/035 |
| | | | 206/532 |
| 2008/0075901 A1 | 3/2008 | Lee et al. | |
| 2008/0113130 A1 | 5/2008 | Schell et al. | |
| 2008/0118749 A1 | 5/2008 | Aubee et al. | |
| 2008/0227900 A1* | 9/2008 | Borke | C08J 5/18 |
| | | | 524/388 |
| 2008/0251411 A1 | 10/2008 | Walker et al. | |
| 2008/0280117 A1 | 11/2008 | Knoll et al. | |
| 2008/0286547 A1 | 11/2008 | Hubbard et al. | |
| 2008/0311370 A1 | 12/2008 | Tatarka | |
| 2009/0020898 A1 | 1/2009 | Goerlitz et al. | |
| 2009/0042026 A1 | 2/2009 | Pasbrig | |
| 2009/0081439 A1* | 3/2009 | Lischefski | B32B 27/08 |
| | | | 428/220 |
| 2009/0110888 A1 | 4/2009 | Wuest et al. | |
| 2009/0123611 A1 | 5/2009 | Bekele | |
| 2009/0208685 A1 | 8/2009 | Rivers et al. | |
| 2009/0285511 A1 | 11/2009 | Aithani | |
| 2009/0310890 A1 | 12/2009 | Suzuki et al. | |
| 2009/0324911 A1 | 12/2009 | Li et al. | |
| 2010/0009208 A1 | 1/2010 | Lee | |
| 2010/0121290 A1* | 5/2010 | Rasmussen | A61F 5/441 |
| | | | 604/333 |
| 2010/0127073 A1 | 5/2010 | Van Esch | |
| 2010/0163446 A1 | 7/2010 | Suzuki et al. | |
| 2010/0279132 A1* | 11/2010 | Niederst | B32B 7/02 |
| | | | 428/480 |
| 2011/0005961 A1 | 1/2011 | Leplatois et al. | |
| 2011/0049003 A1 | 3/2011 | Bellamah et al. | |
| 2011/0101342 A1 | 5/2011 | Kim et al. | |
| 2011/0104342 A1 | 5/2011 | Glaser et al. | |
| 2011/0158564 A1 | 6/2011 | Krumme | |
| 2011/0174651 A1 | 7/2011 | Kimball | |
| 2011/0198261 A1 | 8/2011 | Kurtze et al. | |
| 2011/0262589 A1 | 10/2011 | Safarik | |
| 2012/0101209 A1 | 4/2012 | Khanna et al. | |
| 2012/0107542 A1 | 5/2012 | Nelson et al. | |
| 2012/0152954 A1 | 6/2012 | Bruehl et al. | |
| 2012/0199509 A1 | 8/2012 | McKiel et al. | |
| 2013/0085244 A1 | 4/2013 | Zhao et al. | |
| 2013/0189617 A1 | 7/2013 | Merical et al. | |
| 2013/0243894 A1 | 9/2013 | Schirmer | |
| 2014/0308466 A1 | 10/2014 | Kashima et al. | |
| 2015/0125098 A1 | 5/2015 | Okamoto et al. | |
| 2015/0225151 A1 | 8/2015 | Osborn et al. | |
| 2015/0283029 A1 | 10/2015 | Riis et al. | |
| 2015/0298439 A1 | 10/2015 | Osborn et al. | |
| 2017/0081099 A1 | 3/2017 | Priscal et al. | |

FOREIGN PATENT DOCUMENTS

| | | |
|---|---|---|
| EP | 1300238 A2 | 4/2003 |
| EP | 1300238 A3 | 4/2003 |
| EP | 1398149 A1 | 3/2004 |
| EP | 1398149 B1 | 3/2004 |
| EP | 1602350 A1 | 12/2005 |
| EP | 2468661 A1 | 6/2012 |
| EP | 2796524 A1 | 10/2014 |
| EP | 2803713 A1 | 11/2014 |
| JP | 2007098579 A | 4/2007 |
| JP | 2007098579 A | 9/2007 |
| JP | 2010077391 A | 4/2010 |

(56) References Cited

FOREIGN PATENT DOCUMENTS

| JP | 2012003221 A | 1/2012 |
|---|---|---|
| JP | 2013135414 A | 7/2013 |
| WO | 9827925 A1 | 7/1998 |
| WO | WO1998055537 * | 12/1998 |
| WO | 0226494 A2 | 4/2002 |
| WO | 2007104513 A1 | 9/2007 |
| WO | 20080101946 A2 | 8/2008 |
| WO | 2009098261 A1 | 8/2009 |
| WO | 2009105205 A1 | 8/2009 |
| WO | 2012037180 A1 | 3/2012 |
| WO | 2013096078 A1 | 6/2013 |
| WO | 2013105524 A1 | 7/2013 |
| WO | 2013116445 A1 | 8/2013 |
| WO | 2014088585 A1 | 6/2014 |
| WO | 2015123211 A1 | 8/2015 |

OTHER PUBLICATIONS

Jester, Randy, Conference Paper, "TOPAS® Cyclic Olefin Copolymers in Food Packaging—High Aroma Barrier combined with Low Extractables", 2005 PLACE Conference.

Jester, Randy, "Add a Layaer of COC to Boost Polyolefin Film Properties", Plastics Technology, retrieved online Jan. 27, 2014 at www.ptonline.com/articles/add-a-layer-of-COC-to-boost-polyolefin-film-properties.

Jester, Randy, "Cyclic Olefin Copolymer Enhances Ployolefin Blends for Film Packaging", Plastics Technology, retrieved online Jan. 27, 2014 at www.ptonline.com/articles/cyclic-olefin-copolymer-enhances-ployolefin-blends-for-film-packaging.

Sajilata, M. G., K. Savitha, & V. R. Kanetkar "Scalping of Flavors in Packaged Foods", MS20060142, Sep. 18, 2006.

TOPAS® Advanced Polymers Brochure "Packaging" pp. 1-32.

TOPAS® Advanced Polymers Brochure TB003 "Medical" Jan. 2007.

Zeon Corporation, "Cyclo Olefin Polymer (COP): Zeonor®", retrieved online Jan. 21, 2016, at http://www.zeon.co.ip/content/200181692.pdf.

Todd, William G., Equistar Chemicals LP, "Variables That Affect/Control High Density Polyethylene Film Oxygen/Moisture Barrier", article presented at ANTEC 2003, Nashville, TN, May 4-8, 2003.

Tucker, Nestle, Milliken & Company, "Advancements in PE Nucleation", Power Point presentation dated May 17, 2011.

Horrocks, Martin and Chris Kerscher. 2006. "A Novel Nucleating Agent for Polyethylene". Plastics and Rubber Singapore Journal. 29-39.

Jester, Randy, "Heat Seal Characteristics of Cyclic Olefin Copolymer / Polyethylene Blends", slides 1-18, presented by Randy D. Jester in Sep. 2002 at the TAPPI 2002 PLACE Conference, Boston Massachusetts.

Hansen, Charles M., "Hansen Solubility Parameters; A User's Handbook", p. 8, 29, 272, and 263, Second Edition, CRC Press, 2007.

Ackermann, Dr. Joachim, "Third party submission according to Art. 115 EPC; European patent application No. 15 705 765.4-1303", p. 1-8, Jul. 19, 2017.

Ferrell, Michael William, letter RE: U.S. Appl. No. 14/178,005 and PCT Patent Application Serial No. PCT/US2015/015246, dated Apr. 1, 2016, pp. 1-54, USA.

Hirsch, Arthur, "Why Is an Oxygen Barrier Required?", Flexible Food Packaging; Questions and Answers, 1991, pp. 14-19, Van Nostrand Reinhold, New York, New York.

Bureau, G.; Multon, L.-J., "Molded Plastic Containers for Foodstuff Packaging", Food Packaging Technology, 1996, pp. 283-295, vol. 1, Wiley-VCH, Inc., New York, New York.

Hansen, Charles M., "Hansen Solubility Parameters; A User's Handbook", p. 8, 29, 272, and 263, Second Edition, SRC Press, 2007.

* cited by examiner

MULTILAYER FILM

TECHNICAL FIELD OF THE INVENTION

The present application describes a multilayer film having low water vapor permeability. The multilayer film of the present application is readily thermoformed and is, therefore, suitable for blister packaging sheets as well as for food packaging, medical barriers and device packaging, and other general purposes where low water vapor permeability is desired.

BACKGROUND OF THE INVENTION

Packaging for pharmaceuticals and other medical implements typically employ multilayer films to provide adequate dust and moisture barriers for maintaining the integrity of the items contained within the packages. Conventional films used in these applications contain one or more polymers that are formed from halogenated molecules such as polyvinyl chloride (PVC), polyvinyldiene chloride (PVdC), or fluorinated-chlorinated resins such as poly-chloro-tri-fluoro-ethylene (PCTFE). Although films that incorporate these resins provide effective barriers, manufacturing and disposal of these films can result in undesired effects and sometimes dangerous byproducts. For example, dioxin can be formed from PVC production and disposal, and PVdC can cause excessive corrosion of equipment and packaging machinery.

Producing multilayer films and utilizing such films in a variety of packaging applications is well known. Multilayer films can be produced in a variety of ways and often include extrusion or co-extrusion steps followed by thermal or adhesive lamination, extrusion lamination, and/or extrusion coating. However, some films can be produced solely by co-extrusion.

Co-extrusion of multilayer films is well known in the art and includes co-extrusion blown films and cast films as described, for example, in U.S. Pat. Nos. 3,479,425, 3,797, 987, 3,959,431, and 4,406,547. Multilayered films can be produced by co-extruding two or more melt streams through a die to produce a layered structure when allowed to cool. The co-extruded films can further be laminated to other film layers or can be coated with additional polymers to incorporate more layers into a final film product. Since not all polymers readily adhere to each other, some films may also incorporate tie or adhesive-containing layers that facilitate the adhesion of two or more layers in a film. These tie layers can be co-extruded with the other polymeric layers or can be introduced during a lamination process.

Packaging for pharmaceuticals or other moisture-sensitive materials requires not only low moisture permeability but also other properties such as chemical inertness, clarity, rigidity, or uniform thickness. Properties of the finished film such as overall thickness can be controlled by the relative speed and output of the individual extruders delivering the melt streams to the die. In addition, polymer viscosity and melting temperatures of the individual polymers can affect the thickness and adhesion of the layers to each other following extrusion. However, many of the desired finished film properties are unique to each layer within the multilayer film and, therefore, can make co-extrusion of certain films very challenging.

Multilayer films can be shaped into packaging by subjecting them to a thermoforming process. Plastic thermoforming processes are well known in the art and are described, for example, in U.S. Pat. Nos. 4,421,721, 4,994, 229, 5,106,567, and 6,086,600. Generally, thermoforming is a process for forming a plastic container or packaging structure by heating a sheet of plastic film to a desired forming temperature and shaping the film by subjecting it to vacuum or pressure shaping in a mold.

Thermoformed blister packaging is often used for commercial packaging of food products, personal care products, and human health products such as pharmaceuticals and medical devices or other implements. The use of this type of packaging has become widespread mainly due to the ability to incorporate suitable moisture, dust, UV and/or gas barriers into the packages when such properties are desired for maintaining the product contained by the package. For example, pharmaceutical blister packaging is effective for maintaining drug tablet integrity. However, the common packaging today typically contains the undesired halogenated polymers described above.

Therefore, there is still a need for multilayer films and thermoformed packaging, especially for pharmaceuticals, that is free of halogenated polymers, is chemically inert and non-corrosive, is aesthetically pleasing enough to present the products contained therein, is durable enough to protect the packaging contents, and is capable of being manufactured on existing equipment in pharmaceutical fill/finish manufacturing plants.

SUMMARY OF THE INVENTION

The present application describes a multilayer film with desirable water vapor barrier properties that is substantially free of halogenated polymers.

In a first aspect, the present application describes a multilayer film comprising a first layer, a second layer and a third layer, wherein the first and third layers comprise a halogen-free, substantially chemically inert polymer, and the second layer comprises high density polyethylene (HDPE), a nucleating agent, and a hydrocarbon resin, and wherein the second layer is between the first and third layers, and wherein a tie layer is between the first and second layers and between the second and third layers.

In a second aspect, the present application describes a thermoformed blister package formed from a multilayer film comprising a first layer, a second layer and a third layer, wherein the first and third layers comprise a halogen-free, substantially chemically inert polymer, and the second layer comprises HDPE, a nucleating agent, and a hydrocarbon resin, and wherein the second layer is between the first and third layers, and wherein a tie layer is between the first and second layers and between the second and third layers.

In a third aspect, the present application describes a cast co-extrusion process comprising forming a first layer comprising a halogen-free, substantially chemically inert layer; forming a second layer comprising HDPE, a nucleating agent, and a hydrocarbon resin; forming a third layer comprising a halogen-free, substantially chemically inert layer, forming a tie layer between the first and second layer and between the second and third layer, wherein the tie layers comprise a tie resin, HDPE, and a nucleating agent; co-extruding the first, second, third and tie layers into an extrudate; and cooling the extrudate on a cooling roller to form a five-layer multilayer film.

DETAILED DESCRIPTION OF THE INVENTION

The present application describes a multilayer film substantially free of halogenated polymers, having desirable moisture barrier properties, and useful for preparing thermoformed blister packages.

As used herein, the term "polymer" refers to a macromolecule composed of repeating structural units and includes homopolymers, copolymers and heteropolymers. Therefore, as used herein, polymeric materials can comprise polymers, copolymers, or mixtures thereof.

As used herein, the phrase "halogenated polymers" refers to polymers that contain one or more halogen atoms on the repeating backbone of the polymer. Examples of such polymers include PVC, PVdC and PCTFE.

As used herein, the term "multilayer" means a plurality of layers in a single film generally in the form of a sheet or web which can be made from polymeric or non-polymeric materials bound together by conventional means known in the art, for example, lamination, co-extrusion and the like.

As used herein, the term "co-extrusion" means the process of extruding two or more polymer materials through a single die with two or more orifices arranged such that the extrudates merge and weld together in a laminar structure before cooling or quenching. Co-extrusion methods are known to those skilled in the art and include, but are not limited to, blown co-extrusion and cast co-extrusion. The flat die or slot die cast process includes extruding polymer streams through a flat or slot die onto a chilled roll and subsequently winding the film onto a core to form a roll of film for further processing. In one embodiment, the multilayer film of the present application is prepared by a flat die cast co-extrusion process As used herein, the phrase "blown film" means a film produced by the blown co-extrusion process. In the blown co-extrusion process, streams of melt-plastified polymers are forced through an annular die having a central mandrel to form a tubular extrudate. The tubular extrudate may be expanded to a desired wall thickness by a volume of fluid, air or other gas, entering the hollow interior of the extrudate via the mandrel, and then rapidly cooled or quenched by any of the various methods known to those in the art.

As used herein, the term "layer" refers to a discrete film or sheet component that is coextensive with the film or sheet and has substantially uniform composition. Thus, in a monolayer film, the terms "film," "sheet" and "layer" are synonymous.

As used herein, the term "barrier" refers to a material that controls permeability of one or more elements including, moisture, chemicals, heat, odor, and oxygen or other gases. As it relates to multilayer films, the barrier can be provided by a single layer or multiple layers acting in concert or individually. For example, a moisture barrier refers to a material that limits the permeability of water vapor through the material. In one embodiment, the multilayer film of the present application comprises a moisture barrier.

As used herein, the phrase "tie layer" or "tie material" refers to a polymeric material that has the primary function of adhering one film layer to another. The tie layer can comprise polymers or blends of polymers, with or without modification, that provide superior adhesion of the adjacent layers to each other as compared to the adhesion of the adjacent layers without the presence of the tie layer. Reference to "a tie layer" or "tie material" includes a single tie resin or a blend of two or more resins. In one embodiment, the tie layers comprise tie resin of from about 70% to about 95% by weight of the layer.

As used herein, the phrase "high density polyethylene" or "HDPE" refers to homopolymers of ethylene that have densities of about 0.960 $g/cm^3$ to about 0.970 $g/cm^3$ as well as copolymers of ethylene and an alpha-olefin (such as 1-butene or 1-hexene) that have densities of about 0.940 $g/cm^3$ to about 0.958 $g/cm^3$. HDPE is inclusive of polymers made with Ziegler or Phillips type catalysts and polymers made with single-site metallocene catalysts. HDPE also refers to high molecular weight polyethylenes. In contrast to HDPE wherein the polymers contain some branching, "ultra-high molecular weight polyethylenes" are primarily unbranched and are of a molecular weight that is significantly higher than that of a HDPE. In one embodiment of the multilayer film of the present application, the tie layer comprises from about 5% to about 25% HDPE by weight of the layer. In another embodiment, the tie layer comprises from about 18% to about 22% HDPE by weight of the layer. In another embodiment, the second layer comprises from about 60% to about 95% HDPE by weight of the layer.

As used herein, the phrase "low density polyethylene" or "LDPE" refers to a branched homopolymer having a density of about 0.915 $g/cm^3$ to about 0.930 $g/cm^3$, as well as copolymers containing polar groups resulting from copolymerization, as with vinyl acetate or ethyl acrylate. LDPE typically contains a primary backbone with branching of alkyl substituents of two to eight carbons in length.

As used herein, the phrase "nucleating agent" means a composition that provides an active surface for polymer adsorption and increases polymer crystallinity as a result. Such nucleating agents typically provide better control over crystallization rates. Examples of nucleating agents include minerals such as chalk, talc, clay, kaolin, silicates and the like, and organic agents such as salts of aliphatic or aromatic carboxylic acids, aromatic salts, metallic salts of aromatic phosphorous compounds, quinacridones, and aromatic amides. Further examples include zinc glycerolate, calcium glycerolate, calcium hexahydrophthalate, zinc hexahydrophthalate, salts and the like, and mixtures thereof. In one embodiment, the nucleating agent comprises calcium hexahydrophthalate. In one embodiment, the nucleating agent is present in the tie layer from about 0.2% to about 3.5% by weight of the layer. In another embodiment, the nucleating agent is present in the second layer from about 0.01% to about 3.0% by weight of the layer.

As used herein, the phrase "hydrocarbon resin" refers to a product produced by polymerization from coal tar, petroleum, and turpentine feed stocks, as defined by ISO Standard 472, "Plastics—Vocabulary" incorporated by reference herein to the extent that it teaches hydrocarbon resins. Reference to "a hydrocarbon resin" includes pure resins of a single class or a mixture of two or more classes. In one embodiment, the hydrocarbon resin is present in the second layer from about 3% to about 16% by weight of the layer. In another embodiment, the hydrocarbon resin is present in the second layer from about 5% to about 10% by weight of the layer.

As used herein, the phrase "halogen-free polymer" designates polymers that are free of halogens in the polymer backbones. Such polymers may contain residual halogens from one or more halogen-containing catalysts used in the production of the polymers.

As used herein, the phrase "substantially chemically inert polymer" refers to polymers that generally are not reactive with other elements and do not contain components such as styrene that may leech from the polymeric film layer. Examples of substantially chemically inert polymers include aromatic polyesters such as polyethylene terephthalate (PETG), polyethylene including HDPE and LDPE, polypropylene, polyethylene naphthalate (PEN), polybutylene terephthalate (PBT), polylactic acid (PLA) and cyclic olefin copolymers (COC).

As used herein, the phrase "aromatic polyesters" designates polyester which may be considered to be the polymeric product obtained by polycondensing a diol and a dicarboxylic acid, at least a part of the diol and/or the dicarboxylic acid containing an aromatic ring. Examples of aromatic polyesters include polyethylene terephthalate (PET), amorphous polyethylene terephthalate (APET), crystalline polyethylene terephthalate (CPET), glycol-modified polyethylene terephthalate (PETG) and polybutylene terephthalate (PBT). In one embodiment, the aromatic polyester of the multilayer film of the present application is PETG.

As used herein, the phrase "palindromic film" refers to a multilayer film that is substantially symmetrical. Examples of palindromic films have structures such as A/B/C/B/A, A/B/B/A, or A/B/A. Palindromic films can be produced by co-extrusion, lamination, or any other methods known in the art. One method for preparing palindromic films is a blown co-extrusion process wherein the multilayer film is blown and co-extruded in a tube, flattened upon itself, and then thermally laminated to create a single core layer from the two identical interior "layers" of the flattened tube. Another method for preparing palindromic films is a cast co-extrusion process wherein the resins are extruded through a flat or slot die onto a chill roll and cooled progressively. In one embodiment of the multilayer film of the present application, the multilayer film is a palindromic film. In a further embodiment, the multilayer film is a five-layer palindromic film formed in a cast co-extrusion process.

As used herein, the term "thermoformed" means a film or sheet that is formed into a desired shape by the application of a differential pressure between the film and a mold, by the application of heat, or a combination thereof. Many methods of thermoforming are known in the art.

As used herein, the term "mil" or "mils" means one thousandth of an inch and is used to describe the thickness of a layer, sheet, or film. In one embodiment of the multilayer film of the present application, the thickness of the multilayer film is from about 5 mils to about 25 mils. In a further embodiment, the thickness of the multilayer film is from about 10 mils to about 21 mils. In yet another embodiment, the thickness of the multilayer film is about 10 mils, about 12 mils, about 15 mils, about 18 mils, or about 21 mils.

The multilayer film of the present application can be made with layers of various weights and thicknesses to make a final film product that is any of the thicknesses described above. In one embodiment, the first and third layers of the multilayer film of the present application are each from about 8% to about 10% of the total weight of the film. In another embodiment, the second layer is from about 68% to about 74% of the total weight of the film. In another embodiment, the tie layers are each from about 4% to about 6% of the total weight of the film.

The multilayer film of the present application comprises a moisture barrier. Such barrier properties can be provided by one or more of the layers of the film; and the film is suitable, for example, for packaging pharmaceutical oral dosage forms. In one embodiment of the multilayer film of the present application, the multilayer film provides a moisture vapor transmission rate of less than 0.0007 grams per cavity per day at 40° C. and 75% relative humidity and less than 0.0001 grams per cavity per day at 23° C. and 75% relative humidity when thermoformed into a blister package with size 00 cavities and measured in accordance with USP671. In another embodiment, the multilayer film provides a moisture vapor transmission rate of about 0.0001 to about 0.0005 grams per cavity per day at 40° C. and 75% relative humidity when thermoformed into a blister package with size 00 cavities and measured in accordance with USP671.

Multilayer films have been described in US patent publication 2012/0107542. In contrast, the present application describes a multilayer film comprising a first, a second and a third layer, wherein the first and third layers comprise a halogen-free, substantially chemically inert polymer, and the second layer comprises HDPE, a nucleating agent, and a hydrocarbon resin, and wherein the second layer is between the first and third layers, and wherein a tie layer is between the first and second layers and between the second and third layers. The multilayer films of the present application are advantageously produced by cast co-extrusion without the need for further lamination or coating of the layers such as coating the halogen-free, chemically substantially inert polymer onto the polyethylene containing core layer. Additional advantages include a higher content of high density polyethylene in a thinner final film product, lower melt temperatures for thermoforming, and fewer types of resins in the final film product as compared to similar films produced by blown film co-extrusion processes.

Co-extrusion of multilayer films can be challenging due to the difference in properties of the components of the various layers. For example, it is difficult to co-extrude aromatic polyesters such as PETG in a thin, outer layer of a multilayer film, especially when adhered to a high density polyethylene layer. Undesired outcomes of these co-extrusions include warping of the final films and curtain separation or delamination of the layers during the co-extrusion process. The inventors have found that employing a cast co-extrusion process with a lower-viscosity halogen-free, substantially chemically inert polymer such as PETG provides a multilayer film comprising a first layer comprising PETG and a third layer comprising PETG with a second layer comprising HDPE, a nucleating agent and a hydrocarbon resin between the first layer and the third layer and with a tie layer between the first and second layer and between the second and third layer. In one embodiment, such multilayer film can be produced to a final film thickness of about 10 mils to about 21 mils with the second layer comprising HDPE of at least 50% and up to 95% by weight of the layer. In certain embodiments, the HDPE content of the second layer is from about 55% to about 70% by weight of the layer, in other embodiments, the HDPE content of the second layer is from about 60% to 68% by weight of the layer.

Lower viscosity PETG resins are typically employed in injection molding processes and are deemed not suitable for co-extrusion processes due to their watery consistency. However, the inventors surprisingly found that cast co-extrusion with a first layer comprising low-viscosity PETG and a third layer comprising low-viscosity PETG with a second (core) layer comprising HDPE, a nucleating agent and a hydrocarbon resin between the first layer and the third layer and with a tie layer between the first and second layer and between the second and third layer resulted in a desired multilayer film with high moisture barrier properties, good thermoforming properties and chemical inertness. Such properties are highly desired in packaging for blister packages for pharmaceutical solid dosage forms and for packaging for surgical implements or other medical devices or materials.

Figure 5:
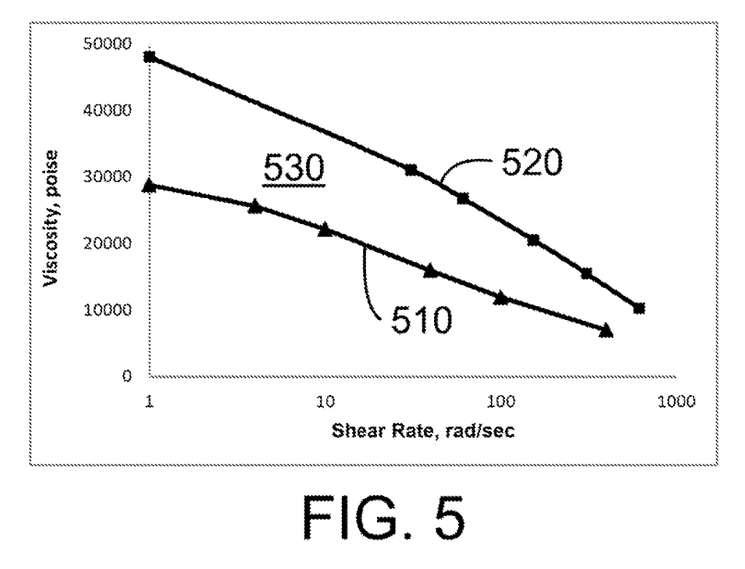
FIG. 5 is a graphical representation of one embodiment of an effective rheology profile of a halogen-free, substantially chemically inert polymer

The halogen-free, substantially chemically inert polymers utilized in the multilayer film of the present application can have certain viscosities defining rheology profiles that are advantageous for use in a cast co-extrusion process. FIG. 5 is a graphical representation of one embodiment of an effective rheology profile of a halogen-free, substantially chemically inert polymer. In this embodiment, the halogen-free, substantially chemical inert polymer can have melt viscosities (in poise) at various shear rates (in radian/second) at a temperature of about 220° C. from the lower range to the upper range described in Table 1.

TABLE 1

| Lower Range | | Upper Range | |
|---|---|---|---|
| Melt viscosity (poise) | Shear rate (rad/sec) | Melt viscosity (poise) | Shear rate (rad/sec) |
| 1 | 28795 | 1 | 48077 |
| 4 | 25637 | 31 | 31080 |
| 10 | 22148 | 61 | 26775 |
| 40 | 15965 | 153 | 20580 |
| 100 | 11956 | 307 | 15540 |
| 400 | 7053 | 613 | 10364 |

In FIG. 5, first lower line 510 plots the melt viscosities of the lower range described in Table 1. First upper line 520 plots the melt viscosities of the upper range described in Table 1. First range 530 is the area between first lower line 510 and first upper line 520 and, for this embodiment, is the effective rheology profile. In this embodiment, for example, the halogen-free, substantially chemically inert polymer has a melt viscosity from about 28,795 poise to about 48,077 poise at 1 radian/second shear rate at a temperature of about 220° C. In another embodiment, the halogen-free, substantially chemically inert polymer of Table 1 and FIG. 5 is PETG.

Figure 6:
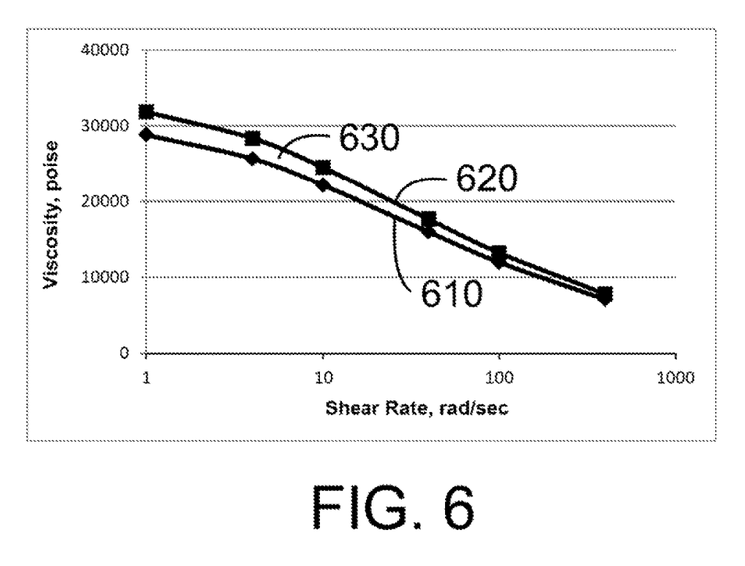
FIG. 6 is a graphical representation of another embodiment of an effective rheology profile of a halogen-free, substantially chemically inert polymer.

FIG. 6 is a graphical representation of another embodiment of an effective rheology profile of a halogen-free, substantially chemically inert polymer. In this embodiment, the halogen-free, substantially chemical inert polymer can have melt viscosities (in poise) at various shear rates (in radian/second) at a temperature of about 220° C. from the lower range to the upper range described in Table 2.

TABLE 2

| Lower Range | | Upper Range | |
|---|---|---|---|
| Melt viscosity (poise) | Shear rate (rad/sec) | Melt viscosity (poise) | Shear rate (rad/sec) |
| 1 | 28795 | 1 | 31826 |
| 4 | 25637 | 4 | 28335 |
| 10 | 22148 | 10 | 24480 |
| 40 | 15965 | 40 | 17645 |
| 100 | 11956 | 100 | 13214 |
| 400 | 7053 | 400 | 7795 |

In FIG. 6, second lower line 610 plots the melt viscosities of the lower range described in Table 2. Second upper line 620 plots the melt viscosities of the upper range described in Table 2. Second range 630 is the area between second lower line 610 and second upper line 620 and, for this embodiment, is the effective rheology profile. In this embodiment, for example, the halogen-free, substantially chemically inert polymer has a melt viscosity from about 28,795 poise to about 31,826 poise at 1 radian/second shear rate at a temperature of about 220° C. In another embodiment, the halogen-free, substantially chemically inert polymer of Table 2 and FIG. 6 is PETG.

The melt viscosities described in Table 1, Table 2, FIG. 5 and FIG. 6 were measured at 220° C. in accordance with ASTM D3835 or ISO 11443.

Figure 1:
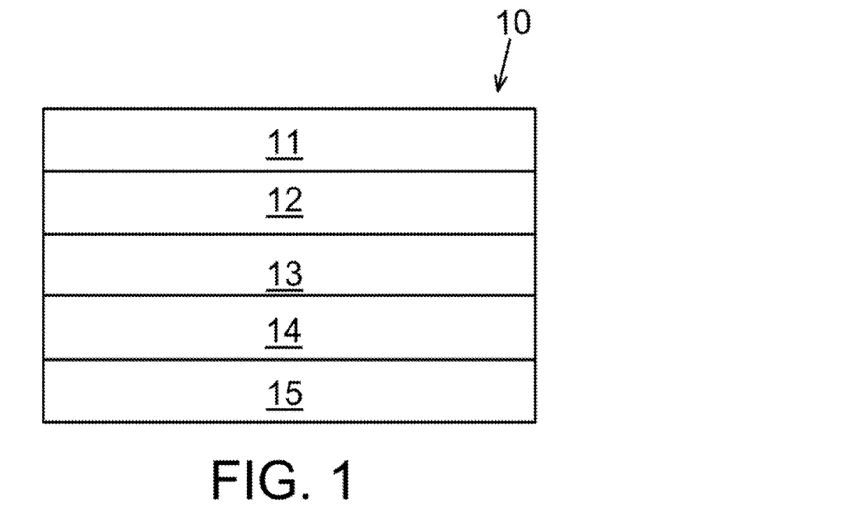
FIG. 1 is a schematic representation of a cross-sectional view of an embodiment of the multilayer film of the present application.

A cross-sectional view of an embodiment of the multilayer film of the present application is represented in FIG. 1. Multilayer film 10 comprises a first halogen-free, substantially chemically inert layer 11, a second polyethylene blend layer 13, a third halogen-free, substantially chemically inert layer 16 and tie layers 12 and 14. First and third halogen-free, substantially chemically inert layers 11 and 15 can comprise PETG. Second polyethylene blend layer 13 can comprise HDPE, a hydrocarbon resin, and a nucleating agent. Tie layers 12 and 14 can comprise a tie resin, HDPE, and a nucleating agent. Polyethylene blend layer 13 can comprise HDPE from about 50% to about 95% by weight of the layer, hydrocarbon resin from about 3% to about 16% by weight of the layer, and a nucleating agent from about 0.01% to about 3.0% by weight of the layer. Tie layers 12 and 14 can comprise a tie resin from about 70% to about 95% by weight of the layer, HDPE from about 5% to about 25% by weight of the layer, and nucleating agent from about 0.2% to 3.5% by weight of the layer.

In one embodiment, first and third layers 11 and 15 are of substantially the same composition. In another embodiment, tie layers 12 and 14 are of substantially the same composition. In a further embodiment, first and third layers 11 and 15 are of substantially different composition. In an additional embodiment, tie layers 12 and 14 are of substantially different composition. In another embodiment, multilayer film 10 is a five layer palindromic film.

Figure 2:
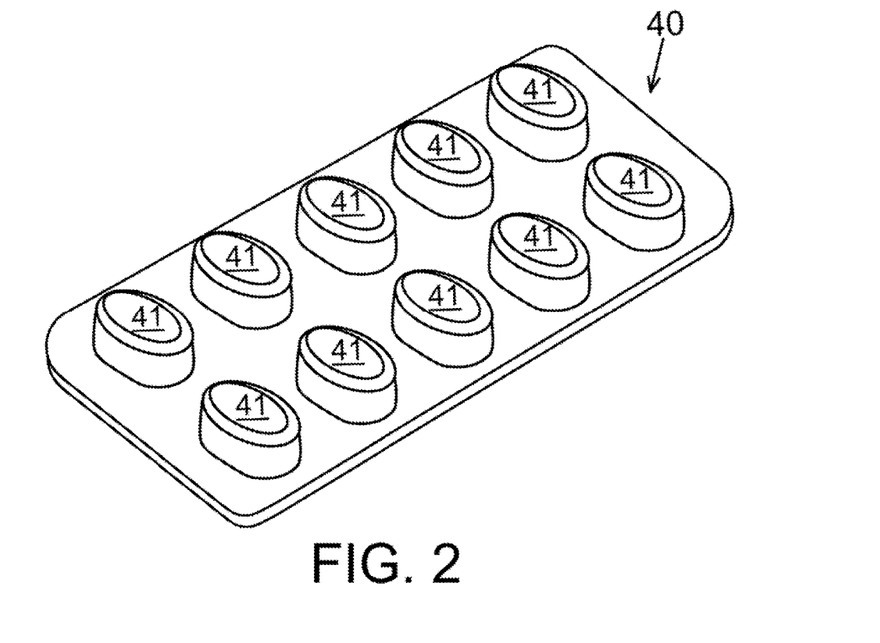
FIG. 2 is a perspective view of a blister package in accordance with one embodiment of the present application.
Figure 3:
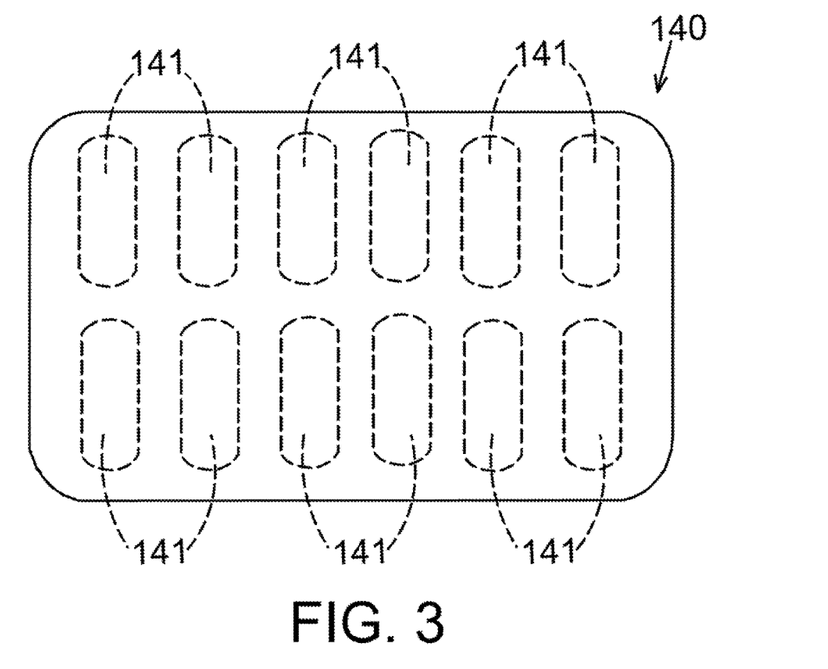
FIG. 3 is a bottom plane view of a blister package in accordance with another embodiment of the present application.
Figure 4:
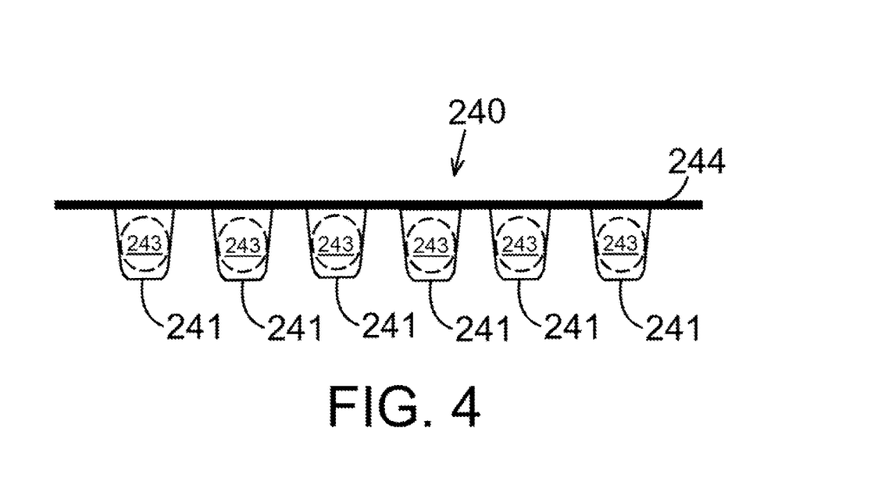
FIG. 4 is a side plane view of a blister package in accordance with a further embodiment of the present application.

A blister package in accordance with one embodiment of the present application is represented in the perspective view of FIG. 2. Blister package 40 comprises a plurality of domed receptacles 41. A bottom plane view of a blister package in accordance with another embodiment of the present application is represented in FIG. 3. In FIG. 3, blister package 140 comprises a plurality of domed receptacles 141. FIG. 4 is a side plane view of a blister package in accordance with a further embodiment of the present application. In FIG. 4, blister package 240 is shown further containing pharmaceutical tablets 243 within domed receptacles 241 and such package is sealed with lidding film 244.

The multilayer film of the present application can be made in a cast co-extrusion process. In one embodiment, the cast co-extrusion process for making a multilayer film comprises:
  a. forming a first layer comprising a halogen-free, substantially chemically inert layer,
  b. forming a second layer comprising HDPE, a nucleating agent, and a hydrocarbon resin;
  c. forming a third layer comprising a halogen-free, substantially chemically inert layer;
  d. forming a tie layer between the first and second layer and between the second and third layer wherein the tie layers comprise a tie resin, HDPE, and a nucleating agent;
  e. co-extruding the first, second, third and tie layers into an extrudate; and
  f. cooling the extrudate on a cooling roller, forming a five-layer multilayer film.

In one embodiment, the first, second, third and tie layers can be co-extruded through a flat die; in another embodiment, the first, second, third and tie layers can be co-extruded through a slot die.

A blister package in accordance with the present application can comprise one or more receptacles for containing the item or items to be packaged. The receptacles can be shaped to conform to the item or items to be packaged or they can be shaped in various forms for more generic applications. In one embodiment, the blister package comprises a plurality of domed receptacles. The plurality of receptacles can be any shape but are generally circular or oblong in a form suitable for containing a pharmaceutical tablet, capsule or gel cap, and can be round or flat bottomed receptacles.

The blister packages in accordance with the present application comprise a number of advantages over blister packages described in the prior art. For example, the packages of the present application do not contain any harmful halogenated polymers. In addition, the film of the present application provides a stackable blister package, especially for pharmaceutical packaging, that does not readily curl. The package retains its relative "flat" structure even after thermoforming, likely because of the palindromic nature of the film. Another advantage, especially for pharmaceutical packages, is that the blister packages of the present application can be produced on the existing form, fill and finish equipment of many pharmaceutical manufacturers and can be thermoformed at a melt temperature that is generally lower than that of conventional films. The PETG outer layers are substantially chemically inert and, thus, do not leech undesired compounds into the composition contained by the package nor cause damage to or corrosion of the packaging equipment. The blister package of the present application also provides a suitable moisture barrier highly desired for pharmaceutical and medical device or other implement packaging.

Blister packages as well as other thermoformed packages are typically sealed with a lidding material that can comprise polymeric film, lacquer, foil, paper, or any combination of the above. The polymeric film can be extrusion coated. The lidding film is typically sealed with a heat-activated sealant. In one embodiment, the lidding material comprises extrusion coated sealant and foil. In another embodiment, the lidding material comprises extrusion coated sealant, foil and lacquer.

The above description and the following examples illustrate certain embodiments of the present application and are not to be interpreted as limiting. In addition, individual embodiments described can be combined with one or more additional embodiments and such combinations are within the scope of the application. Modifications and adaptations of the various conditions and parameters normally encountered in the art will be apparent to those skilled in the art and are deemed to be within the spirit and scope of the present application.

EXAMPLES

Examples 1a and 1b

The following multilayer films were produced in a cast co-extrusion process. Generally, the five-layer cast co-extruded film was produced with the percent compositions as described in Table 3 for each layer. The overall film thickness was from about 10 mils to about 21 mils.

TABLE 3

| | Example 1a | | | Example 1b | | |
|---|---|---|---|---|---|---|
| Layer | Weight % of film | Component | Weight % of layer | Weight % of film | Component | Weight % of layer |
| First | 9.3 | PETG | 100 | 9.3 | PETG | 100 |
| Tie | 5 | Tie resin | 76 | 5 | Tie resin | 76 |
| | | HDPE | 20 | | HDPE | 20 |
| | | Nucleating agent blend | 2 | | Nucleating agent blend | 2 |
| | | Color concentrate | 2 | | Color concentrate | 2 |
| Second | 71.4 | HDPE | 92.1 | 71.4 | HDPE | 84.2 |
| | | hydrocarbon resin | 7.4 | | hydrocarbon resin | 14.8 |
| | | Nucleating agent blend | 0.5 | | Nucleating agent blend | 0.5 |
| Tie | 5 | Tie resin | 76 | 5 | Tie resin | 76 |
| | | HDPE | 20 | | HDPE | 20 |
| | | Nucleating agent blend | 2 | | Nucleating agent blend | 2 |
| | | Color concentrate | 2 | | Color concentrate | 2 |
| Third | 9.3 | PETG | 100 | 9.3 | PETG | 100 |

Example 2

Moisture vapor transfer rate (MVTR) was measured for samples A-H both as flat sheet film and as thermoformed blister packages (round or flat bottom cavities) made from the film. The round or flat bottom cavities were sized for US Pharmacopia standard size 00 capsules. Film compositions for samples A-H are as shown in Table 4. Flat sheet MVTR was measured at 100° F. and 90% relative humidity in g/M²/day in accordance with ASTM F1249 and the results are shown in Table 5. MVTR was measured for the thermoformed blister packages in accordance with USP671 at 23° C. or 40° C. and at a relative humidity of 75%. MVTR results for the blister packages are shown in Table 6.

TABLE 4

| Sample | Film Composition |
|---|---|
| A | As in Example 1b except additional tie resin replaced the color concentrate in both tie layers and 10% crystal polystyrene (by weight) replaced 10% PETG (by weight) in the first and third layers. |
| B | As in Example 1b except additional tie resin replaced the color concentrate in both tie layers. |
| C | As in Example 1b except additional tie resin replaced the color concentrate in both tie layers. |
| D | Example 1a |
| E | Example 1a |
| F | Example 1b |
| G | 250 μm PVC film coated with 60 g/m² PVdC |
| H | 250 μm PVC film coated with 120 g/m² PVdC |

TABLE 5

| Sample | mil thickness | Flat Sheet |
|---|---|---|
| A | 9.9 | 0.206 |
| B | 16.7 | 0.101 |
| C | 20.9 | 0.096 |
| D | 14.8 | 0.113 |
| E | 20.3 | 0.080 |
| F | 21.2 | 0.092 |
| G | 11.2 | 0.397 |
| H | 12.6 | 0.254 |

TABLE 6

| Sample | mil thickness | Round bottom 23° C. | Round bottom 40° C. | Flat bottom 23° C. | Flat bottom 40° C. |
|---|---|---|---|---|---|
| A | 9.9 | 0.0001060 | 0.000446 | 0.0000929 | 0.000389 |
| B | 16.7 | 0.0000560 | 0.000245 | — | — |
| C | 20.9 | 0.0000392 | 0.000167 | 0.0000196 | 0.000178 |
| D | 14.8 | — | — | 0.0000571 | 0.000242 |
| E | 20.3 | — | — | 0.0000339 | 0.000169 |
| F | 21.2 | — | — | 0.0000196 | 0.000172 |
| G | 11.2 | 0.0000540 | 0.000469 | 0.0000750 | 0.000521 |
| H | 12.6 | 0.0000319 | 0.000272 | 0.0000464 | 0.000361 |

What is claimed is as follows:

1. A low water vapor permeability multilayer film for pharmaceutical or medical implement packaging comprising:
   a. a first layer comprising a first halogen-free, substantially chemically inert polymer;
   b. a second layer comprising high density polyethylene (HDPE), a nucleating agent, and a hydrocarbon resin;
   c. a third layer comprising a second halogen-free, substantially chemically inert polymer;
   d. a tie layer between the first and second layers; and
   e. a tie layer between the second and third layers;
   wherein the second layer is between the first and third layers; and
   wherein the multilayer film has a flat sheet MVTR less than 2.1 g·mil/m²/day when tested per ASTM F1249 at conditions of 100° F. and 90% relative humidity.

2. The film of claim 1, wherein at least one halogen-free, substantially chemically inert polymer of the first layer or the third layer has a melt viscosity from about 28,795 poise to about 48,077 poise at 1 radian/second shear rate at a temperature of about 220° C.

3. The film of claim 2, wherein at least one halogen-free, substantially chemically inert polymer of the first layer or the third layer has a melt viscosity from about 28,795 poise to about 31,826 poise at 1 radian/second shear rate at a temperature of about 220° C.

4. The film of claim 1, wherein at least one halogen-free, substantially chemically inert polymer of the first layer or the third layer is an aromatic polyester.

5. The film of claim 4, wherein the aromatic polyester is PETG.

6. The film of claim 5, wherein the PETG has a melt viscosity from about 28,795 poise to about 48,077 poise at 1 radian/second shear rate at a temperature of about 220° C.

7. The film of claim 6, wherein the PETG has a melt viscosity from about 28,795 poise to about 31,826 poise at 1 radian/second shear rate at a temperature of about 220° C.

8. The film of claim 1, wherein at least one tie layer comprises a tie resin, HDPE, and a nucleating agent.

9. The film of claim 8, wherein the HDPE is present in the at least one tie layer from about 5% to about 25% by weight of the layer.

10. The film of claim 9, wherein the HDPE is present in the at least one tie layer from about 18% to about 22% by weight of the layer.

11. The film of claim 8, wherein the tie resin is present in the at least one tie layer from about 70% to about 95% by weight of the layer.

12. The film of claim 8, wherein the nucleating agent is present in the at least one tie layer from about 0.2% to about 3.5% by weight of the layer.

13. The film of claim 1, wherein the HDPE is present in the second layer from about 60% to about 95% by weight of the layer.

14. The film of claim 1, wherein the hydrocarbon resin is present in the second layer from about 3% to about 16% by weight of the layer.

15. The film of claim 1, wherein the nucleating agent is present in the second layer from about 0.01% to about 3.0% by weight of the layer.

16. The film of claim 1, wherein the nucleating agent comprises zinc glycerolate salts or calcium hexahydrophthalate.

17. The film of claim 16, wherein the nucleating agent comprises calcium hexahydrophthalate.

18. The film of claim 1, wherein the first layer and third layer are each from about 8% to about 10% of the total weight of the film.

19. The film of claim 1, wherein the second layer is from about 68% to about 74% of the total weight of the film.

20. The film of claim 1, wherein each tie layer is from about 4% to about 6% of the total weight of the film.

21. The film of claim 1, wherein the tie layer between the first and second layer and the tie layer between the second and third layer are of substantially the same composition.

22. The film of claim 1, wherein the tie layer between the first and second layer and the tie layer between the second and third layer are of substantially different composition.

23. The film of claim 1, wherein the first and third layers are of substantially the same composition.

24. The film of claim 1, wherein the first and third layers are of substantially different composition.

25. A thermoformed blister package formed from a multilayer film as claimed in claim 1.

26. The blister package of claim 25, wherein the package comprises a plurality of domed receptacle portions.

* * * * *

UNITED STATES PATENT AND TRADEMARK OFFICE
CERTIFICATE OF CORRECTION

PATENT NO. : 9,962,913 B2  
APPLICATION NO. : 14/646778  
DATED : May 8, 2018  
INVENTOR(S) : Christopher L. Osborn Page 1 of 1

It is certified that error appears in the above-identified patent and that said Letters Patent is hereby corrected as shown below:

On the Title Page

On page 2, in Column 2, under "FOREIGN PATENT DOCUMENTS", Line 10, delete "JP 2007098579 A 9/2007" and insert -- JP 2007156348 A 6/2007 --, therefor.

On page 3, in Column 2, under "OTHER PUBLICATIONS", Line 8, delete "Nestle" and insert -- Nesha --, therefor.

On page 3, in Column 2, under "OTHER PUBLICATIONS", Line 10, delete "2006." and insert -- 2008, --, therefor.

In the Specification

In Column 8, Line 34, delete "16" and insert -- 15 --, therefor.

Signed and Sealed this  
Thirty-first Day of December, 2019

Andrei Iancu  
*Director of the United States Patent and Trademark Office*